3,306,773
PROTECTION OF SINTERED ALUMINUM FROM ALTERATION IN ORGANIC LIQUIDS

Jean Laporte and Francois Giolito, Lyon, France, and Hans-Walter Schleicher, Leggiuno-Sangiano, Italy, assignors to Societe Progil, Paris, France
No Drawing. Filed May 31, 1963, Ser. No. 284,308
Claims priority, application France, June 7, 1962, 900,012
4 Claims. (Cl. 134—2)

The present invention relates to the protection of light metals against alteration under heat in organic liquids and, particularly, to the protection of sintered aluminum, intended to be heated in contact with a heat transmission fluid. It relates also to light metal parts thus protected.

Light metals, particularly aluminum, magnesium and their alloys, are often employed in the construction of heat exchangers. This applies particularly to exchangers used in nuclear energy generators. In this field, an improvement consists in the use of products obtained by the sintering of aluminum oxide powder, according to the Irmann technique. These products, which contain 1 to 20% $Al_2O_3$ and usually 5% to 15%, are known commercially under the name "SAP" and have mechanical characteristics when heated which are better than those of massive aluminum.

It has been found, however, that in operation of the apparatus the hot walls of "SAP" tubes in contact with heat transfer liquids, such as terphenyls for example, gradually become covered with a black deposit. This is followed by an appreciable decrease in the coefficient of thermal transfer of the wall. On the other hand, the deposit partly passes into the liquid, in the form of particles, and contaminates it.

The present invention relates to an important advance in the use of light metals and, particularly, sintered aluminum of the "SAP" type, in contact with organic heat-transfer liquids. It consists in a treatment which allows the material to be protected against the formation of the aforementioned deposit. If the tubes, sheets or other parts which are to be used in the heat exchanger are previously treated in accordance with the process of the invention, they can remain in contact with liquids such as diphenyl, terphenyls and so on at elevated temperatures for very long times, without any alteration or any modification of their coefficient of thermal transmission and without contamination of the liquid in circulation.

The process according to the invention consists in treating light metal parts, particularly "SAP" sintered aluminium, with an aqueous alkaline solution in order to produce a very slight cleaning effect, rinsing and drying such treated parts before putting them into service in apparatus where they are intended to become in contact with a hot organic liquid for the transfer of heat.

The alkaline solution according to the invention can be constituted by water containing caustic soda, potash, lithium, hydroxide or any alkaline salt of a sufficiently weak acid, for example a carbonate, acetate, propionate or tartrate.

Although the concentration of the solution can vary widely, it is very suitable to operate with concentrations in the vicinity of normality.

The duration of treatment of the part with the solution depends upon the concentration and the temperature of the latter. According to a preferred embodiment of the invention, the treatment is effected at the ambient or in the vicinity of the ambient temperature for a period of from 1 to 30 minutes, depending upon the concentration of the solution.

Preferably, the treatment takes place in several successive stages, comprising successively shorter cleaning times, each followed by rinsing with water, drying being effected after the final rinsing. With normal caustic soda solution, such a treatment in two stages gives excellent results.

In a general manner, caustic soda constitutes an advantageous reagent for carrying out the novel process and, for this reason, the following examples relate to its use, although other alkaline solutions are also suitable. As regards concentrations, temperatures, durations of treatment and other operative conditions, the examples given are in no way limitative.

Example 1

Sheets of "SAP" sintered aluminium of 10% aluminium content, were heated for periods of 24, 100 and 200 hours, at 450° C. in sealed ampoules, containing terphenyl composed of 15% of the ortho isomer, 80% of the meta and 5% of the para. After removal of the plates from the liquid, it was found that they were covered with a black deposit, interspersed with cleared parts and darker portions. Very fine particles detached from the deposit were found in the terphenyl after heating. Examination of the deposit showed that it was insoluble in organic solvents and that its weight was relatively low. In fact, the increase in weight of the plates heated for 200 hours was only 0.1 mg./cm.$^2$.

In another series of tests, sheets identical to the foregoing were treated in the following manner:

Contact with an agitated normal caustic soda solution at ordinary temperature for 10 minutes;
Rinsing in ordinary water at the ambient temperature; repetition of treatment in the normal caustic soda solution for two minutes;
Further rinsing;
Drying in warm air.

The samples of the sheet thus treated were plunged into the mixture of terphenyls indicated above and heated at 450° C. for 24, 100 and 200 hours. No black layer was observed under these new conditions. The variation in weight was substantially nil.

Example 2

Analogous experiments were repeated with terphenyl containing a certain quantity of water, 13 mg. of water being introduced into the ampoules before their closure, corresponding to an amount of 500 p.p.m. of water.

When the samples which had not previously been cleaned were heated the phenomenon of soiling with a black deposit was observed. The increases in weight were not particularly large. Cleaning with caustic soda as described above suppressed the soiling phenomenon, under the same conditions of temperature and time as in Example 1.

Example 3

Fragments of "SAP" tubes and sheets were subjected to heating in the same mixture of terphenyls, but in the presence of an atmosphere of oxygen.

On the non-cleaned samples of tubes, the formation of point-like, black deposits along the internal generatrices was observed (surface of the order of several mm.$^2$, height 2 to $\%_{10}$ mm.).

On the sheets, the formation of a continuous layer was observed. After cleaning with caustic soda according to the method of Example 1 and for periods of up to 200 hours, no deposit was observed.

We claim:

1. A process for forming a surface resistant to corrosion by diphenyl and terphenyl heat exchange fluids on the surface of a sintered aluminum article obtained by sintering aluminum oxide powder comprising preliminarly subjecting said surface before contact with said heat exchange fluid to an aqueous alkaline solution selected from the group consisting of an alkali metal hydroxide and a salt thereof with a weak acid selected from the group consisting of carbonic, acetic, propionic and tartaric acids, said solution being at a concentration of about one normal at ambient temperature for a period of from 1 to 30 minutes, rinsing said solution from said surface with water and drying said surface.

2. A process according to claim 1 in which the contact of the sintered aluminum article with the aqueous alkaline solution is effected several times, each being followed by rinsing with water and the last rinsing being followed by drying.

3. A process according to claim 1 in which the aqueous alkaline solution is a solution of sodium hydroxide.

4. A process according to claim 3 in which the sintered aluminum article is twice contacted with said 1 normal sodium hydroxide solution, rinsed after each contact stage and then dried.

References Cited by the Examiner

UNITED STATES PATENTS

| | | | |
|---|---|---|---|
| 2,393,036 | 1/1946 | Farr | 165—180 |
| 2,671,717 | 3/1954 | Ferguson | 134—2 X |

FOREIGN PATENTS

| | | |
|---|---|---|
| 550,854 | 6/1932 | Germany. |
| 505,731 | 5/1939 | Great Britain. |

DONALL H. SYLVESTER, *Primary Examiner.*

A. D. KELLOGG, *Assistant Examiner.*